US005797204A

United States Patent [19]

Paulos

[11] Patent Number: 5,797,204
[45] Date of Patent: Aug. 25, 1998

[54] CALENDAR ORGANIZING SYSTEM

[76] Inventor: John Paulos, 3440 Dupont Ave. So., Minneapolis, Minn. 55408

[21] Appl. No.: 720,302

[22] Filed: Sep. 27, 1996

[51] Int. Cl.⁶ .................................................. G09B 19/00
[52] U.S. Cl. .......................... 40/122; 40/124.2; 40/775; 211/45
[58] Field of Search .......................... 40/122, 775, 776, 40/373, 124.2, 124.4; 283/2–4; 211/45, 50, 55, 80, 10; 281/31, 37, 22, 33

[56] References Cited

U.S. PATENT DOCUMENTS

| | | | |
|---|---|---|---|
| 811,846 | 2/1906 | Hidden | 40/122 |
| 1,879,260 | 9/1932 | Howard . | |
| 2,831,278 | 4/1958 | Myers . | |
| 3,207,421 | 9/1965 | Hunger et al. . | |
| 3,911,606 | 10/1975 | Hunkins | 40/110 |
| 3,983,649 | 10/1976 | Ellis et al. | 40/122 |
| 4,058,916 | 11/1977 | Whyatt | 40/107 |
| 4,803,795 | 2/1989 | Questel et al. | 40/124 |
| 4,850,124 | 7/1989 | Wilen | 40/122 |
| 4,975,061 | 12/1990 | Avrill | 434/304 |
| 4,995,221 | 2/1991 | Stemmer, Jr. | 40/122 |
| 5,097,961 | 3/1992 | Patino et al. | 211/521 |
| 5,214,869 | 6/1993 | Wilen | 40/122 |
| 5,412,886 | 5/1995 | Quinn | 40/119 |

FOREIGN PATENT DOCUMENTS 2535709  2/1977  Germany .................................. 40/775

*Primary Examiner*—Cassandra H. Davis
*Attorney, Agent, or Firm*—Kinney & Lange, P.A.

[57] ABSTRACT

A calendar organizer has pockets for receiving documents or other items associated with each day on the calendar. Five horizontally extending front sheets attached to a substantially continuous backing sheet. Seven front pocket surface portions are defined within each front sheet. Pockets are created by attaching the bottom edge and one vertical edge of the front pocket surface portion to the backing sheet, and two edges of the pockets are left free. A template is used to create the front sheets. The front sheets overlay each other, such that the top edge of lower pockets is higher on the backing sheet than the bottom edge of upper pockets.

20 Claims, 7 Drawing Sheets

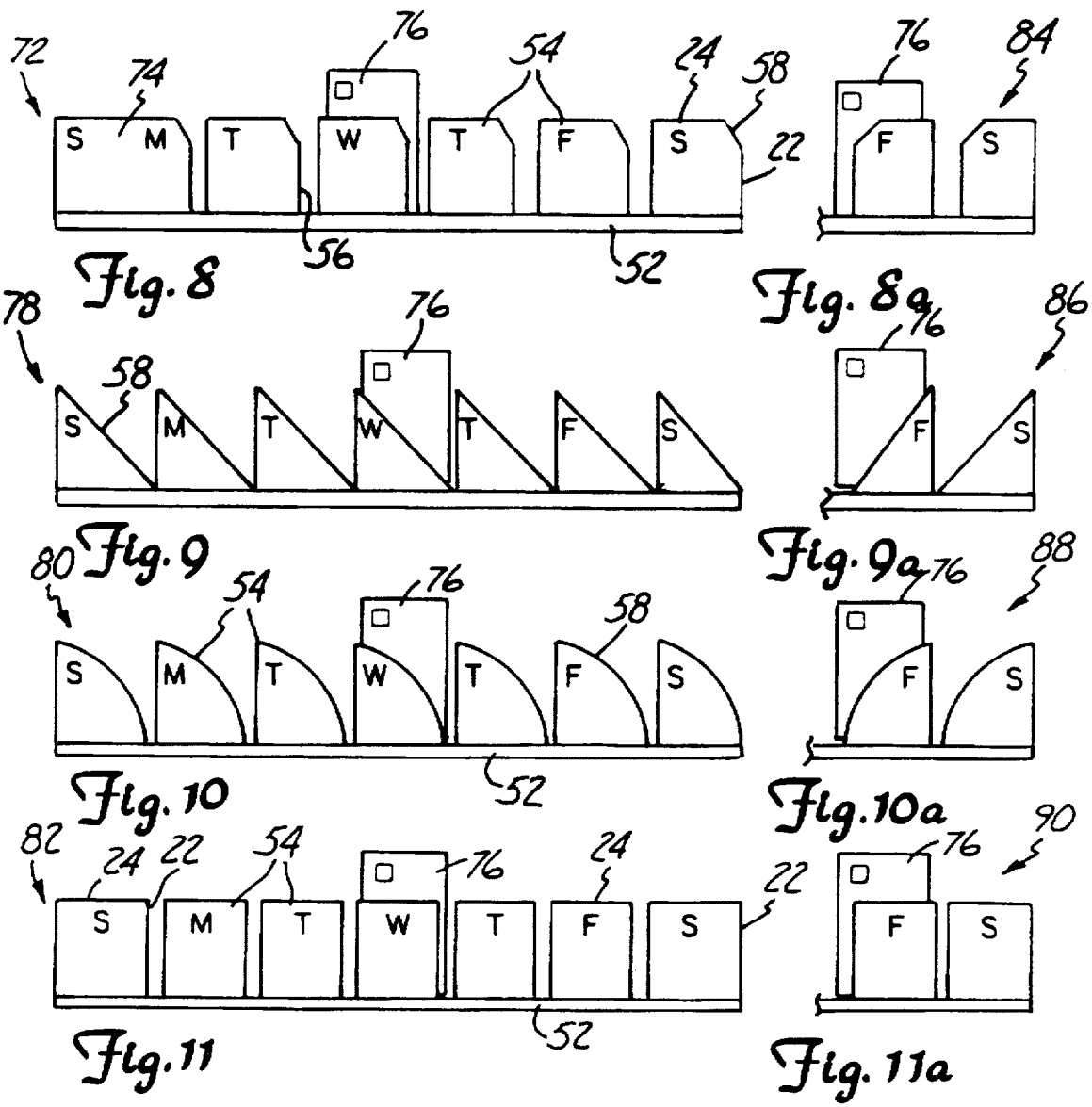

5,797,204

1

CALENDAR ORGANIZING SYSTEM

BACKGROUND OF THE INVENTION

The present invention pertains to organizers, and, more particularly, to calendar organizing systems which include pockets to receive envelopes, cards, or other documents associated with days on the calendar.

Calendar organizers have been known for some time. For instance, U.S. Pat. No. 811,846 to C. P. Hidden, U.S. Pat. No. 3,207,421 to H. R. Hunger et al., U.S. Pat. No. 3,911,606 to Hunkins, U.S. Pat. No. 4,975,061 to Avrill and U.S. Pat. No. 5,412,886 to Quinn each disclose a calendar organizer with pockets for the days of the month. These calendar organizers generally have a large backing board with a front sheet attached thereto, with pockets formed between the front sheet and the back sheet. Indicia or markings are printed on the calendar organizer to identify dates associated with each of the pockets.

However, these previous calendar organizers have deficiencies which have prevented them from being widely used. In particular, the pockets on previous calendar organizers may have an opening size which limits the size of the items retainable in the pockets. Several concepts have been tried to enable the calendar organizers to receive larger items within the pockets. For instance, the pockets on some previous calendar organizers have been enlarged to cover two or more days on the calendar. While each pocket may be larger, a single multiple day pocket no longer distinguishes between the two or more days which it covers. Alternatively, the front sheet portion of the pocket on some previous calendar organizers may be dimensionally larger than the back sheet portion, so the pocket can expand further outward from the back sheet. The construction of these calendar organizers is somewhat time consuming and difficult, creating a more expensive product. A third way to increase pocket size is to increase the overall size of the entire calendar organizer. However, an excessively large calendar organizer is both expensive to construct and inconvenient to use and store.

Additional problems exist with previous calendar organizers. The pockets on many previous calendar organizers are not constructed for easy insertion and removal of documents. Some previous calendar organizers use specially-made reminder cards or inserts which are intended only for use with the calendar organizer. While the specially-made cards may be easily received in the pockets, other problems arise. Construction of the specially-made cards is time-consuming for the user or expensive for the manufacturer, and a limited number of pre-made cards cannot cover the myriad of possible items which may be associated with each day of the calendar.

A better calendar organizing system is needed which will avoid these problems of the prior art while at the same time be convenient to use and inexpensive to produce.

SUMMARY OF THE INVENTION

The present invention is a calendar organizing system with pockets for receiving documents or other items associated with each day on the calendar. The system includes a substantially continuous backing sheet and a front sheet attached to the backing sheet. Front pocket surface portions are defined within the front sheet. Pockets are created by attaching the bottom edge and one vertical edge of the front pocket surface portion to the backing sheet, and two edges of the pockets are left free. The pockets retain the corner of documents inserted into the pockets and the documents

2 carried in the pockets can be of a height and width considerably larger than the pocket itself. In the preferred embodiment, five front sheets, each having seven front pocket surfaces, are attached to the backing sheet. The front sheets overlay each other, such that the top edge of lower pockets is higher on the backing sheet than the bottom edge of upper pockets.

BRIEF DESCRIPTION OF THE DRAWINGS

FIG. 8 is a front view of a first alternative front sheet template design for the present invention.

FIG. 8a is a reverse orientation of the front sheet template of FIG. 8.

FIG. 9 is a front view of a second alternative front sheet template design for the present invention.

FIG. 9a is a reverse orientation of the front sheet template of FIG. 9.

FIG. 10 is a front view of a third alternative front sheet template design for the present invention.

FIG. 10a is a reverse orientation of the front sheet template of FIG. 10.

FIG. 11 is a front view of a fourth alternative front sheet template design for the present invention.

FIG. 11a is a reverse orientation of the front sheet template of FIG. 11.

DETAILED DESCRIPTION OF THE PREFERRED EMBODIMENTS

Figure 1:
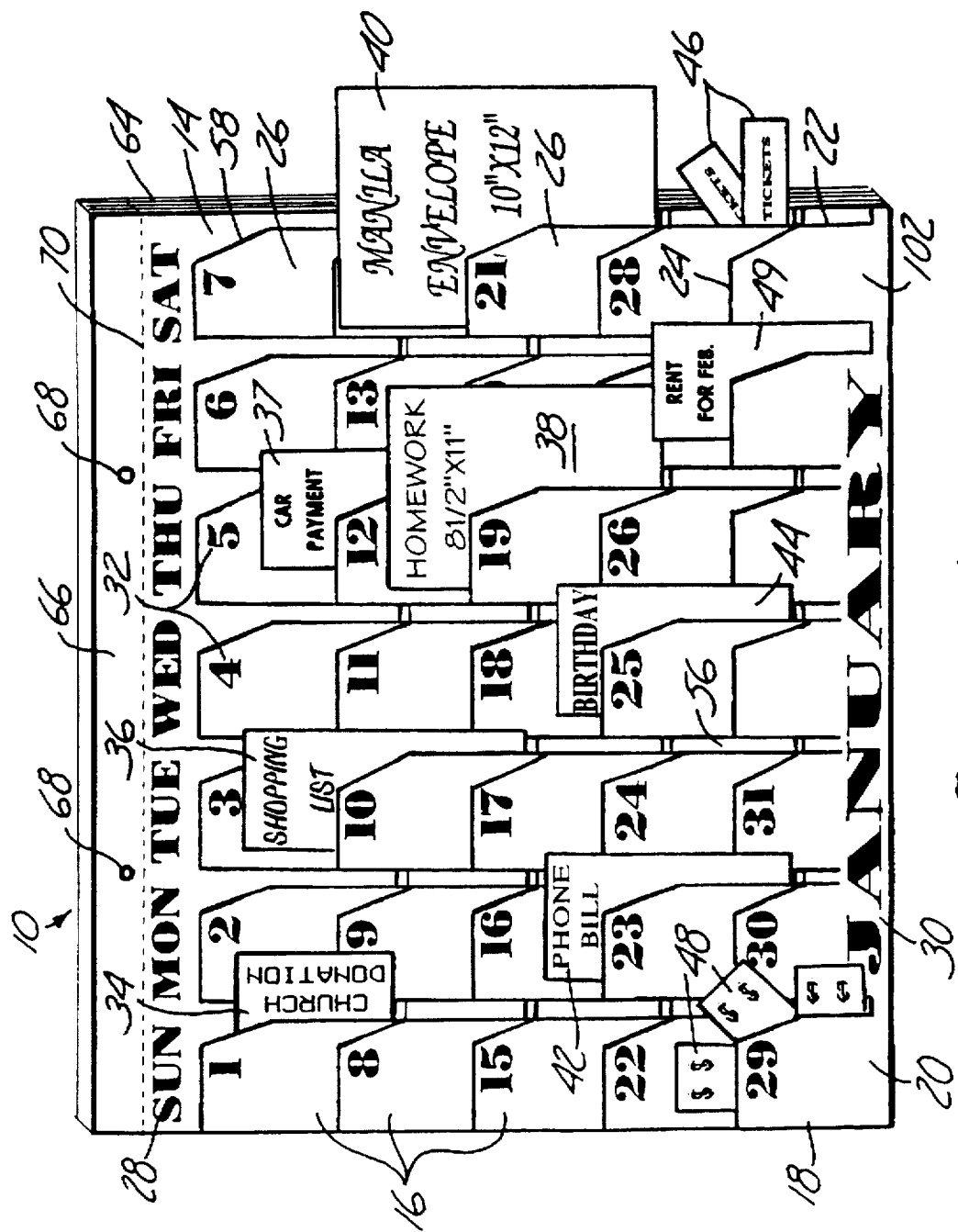
FIG. 1 is a front perspective view of the calendar organizer of the present invention in use.

FIG. 1 shows the calendar organizer 10 of the present invention in use. The calendar organizer 10 includes several (preferably five) front sheets 12 attached to a backing sheet 14. Each of the front sheets 12 includes a number of (preferably seven) front pocket surfaces 16. Each of the front pocket surfaces 16 has a left edge 18 and a bottom edge 20 which are attached to the backing sheet 14. Each of the front pocket surfaces 16 has a right edge 22 and a top edge 24 which are not attached to the backing sheet 14, thereby creating pockets 26 with open top and right edges.

Day markings 28 are positioned along the top of the calendar organizer 10. The name of the month 30 is positioned along the bottom of the calendar organizer 10. Date markings 32 are located along the top edge 24 of each pocket 26. The grid pattern arrangement of the calendar organizer 10 with five rows and seven columns of pockets 26 allows each pocket 26 to correspond singularly to a day of a calendar month. The extra unlabeled pockets 26 can be used for items associated with the next month, or for items not associated with a particular date.

The pockets 26 are intended for holding envelopes, tickets, documents, homework, etc., and each individual pocket 26 is associated with a particular calendar day on which the envelope is to be sent, the tickets are to be used, the homework is to be handed-in, etc. In the example shown in FIG. 1, a number of items are shown retained in the pockets 26 of the calendar organizer 10:

(a) a church donation 34 associated with Monday, January 1;

(b) a shopping list 36 associated with Tuesday, January 10;

(c) a car payment 37 associated with Thursday, January 12;

(d) a 8½" by 11" homework assignment 38 associated with Thursday, January 19;

(e) a 10" by 12" manilla envelope 40 associated with Saturday, January 21;

(f) a phone bill 42 associated with Monday, January 23;

(g) a birthday card 44 associated with Wednesday, January 25;

(h) tickets 46 associated with Saturday, January 28;

(i) a money payment 48 is associated with Sunday, January 29; and (j) a rent envelope 49 for February retained in an unlabeled pocket 26 on the bottom of the calendar organizer 10.

As can be seen by this example, each of the pockets 26 having two free edges 22, 24 can retain documents significantly larger in both dimensions than the pocket 26. For instance, the 10" by 12" manilla envelope 40 and the 8½" by 11" homework assignment 38 are each significantly larger both in height and width than any of the pockets 26. However, because the pockets 26 retain a bottom corner of the documents, the pockets 26 can hold large documents associated with that particular day.

Documents can be placed in the pockets 26 in either an upright orientation, such as the shopping list 36, or a horizontal orientation, such as the church donation 34. For appropriately sized items (such as long envelopes) a horizontal orientation keeps the item from covering the markings 32 for preceding weeks. Small items (such as the tickets 46) can be retained within the pocket 26 in a horizontal orientation and still be seen simply by letting the item lay partially exposed outside the open side edge 22 of the pocket 26. The small item is visibly supported without the worry of gravity pulling and hiding the item inside the pocket 26.

Figure 2:
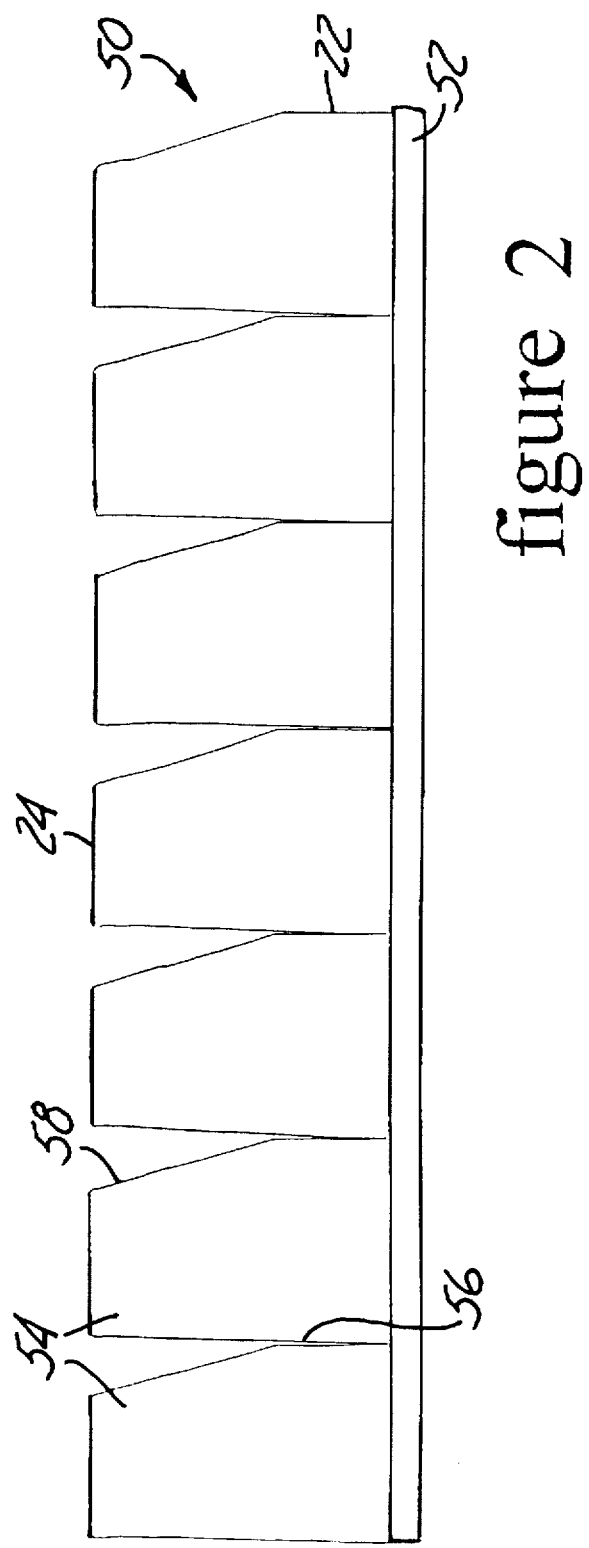
FIG. 2 is a front view of a template for use in making front sheets for the calendar organizer.

FIG. 2 shows a front sheet template 50 for use in constructing front sheets 12 for the present invention. The front sheet template 50 includes a bottom board 52 with front pocket templates 54 extending upwardly therefrom. The front sheet template 50 preferably includes seven of the front pocket templates 54, one for each day of the week. The front sheet template 50 and repeating shape of the horizontal pocket surfaces 16 simplify manufacturing of the calendar organizer 10.

Each front pocket template 54 is uniquely shaped for the pockets 26 of the present invention. Each front pocket template 54 is from 3" to 8" tall and preferably is 6¾" tall. Each front pocket template 54 is from 3" to 8" wide and preferably is 4¼" wide. A gap 56 is positioned between each of the pocket templates 54. The gap 56 may be from a ⅟₁₆" to ½" wide and helps provide unrestricted access to the open right edge 22 of the pocket 26. A wedge may be cut out of the open edge of the pocket 26 to provide a slanted edge 58. The slanted edge 58 helps provide unrestricted access to the open periphery of the pocket 26. The slanted edge 58 also keeps the pocket 26 from having a 90° free corner, which could cause tearing of the pocket 26 or become crumpled or frayed during insertion and removal of items from the pocket 26. In the preferred embodiment, the top, generally horizontal free edge 24 is about 3" long, the side, generally vertical free edge 22 is about 3" long, and the slanted free edge 58 is about 3¼" long and provided at about a 25° angle to vertical.

Workers skilled in the art will appreciate that the front sheets 12 could be made as a mirror image, with a slanted edge along the left side of the front pocket surfaces. Each front pocket surface could be attached to the backing sheet 14 along the bottom edge and the right side edge. However, large items which extend out of such a pocket toward the left may cover the date marking or free edge for a preceding pocket. Having the right side edge 24 free allows a document to extend out of the pocket 26 to the right, so as not to cover the preceding day on the calendar organizer 10 regardless of the size of the document.

The bottom board 52 can be made of numerous materials, and in the preferred embodiment is made of a strip of wood approximately ½" high, ¼" thick and 30" long. The front pocket templates 54 can be made out of any flat, relatively stiff sheet material, such as a piece of card stock. Workers skilled in the art will appreciate that the bottom board 52 is not a necessary part of the template 50, but bottom board 52 adds rigidity to the front pocket templates 54. Similarly, workers skilled in the art will appreciate that the entire template 50 is not necessary if the front sheets 12 are die cut or formed by another operation which does not require a template.

Figure 3:
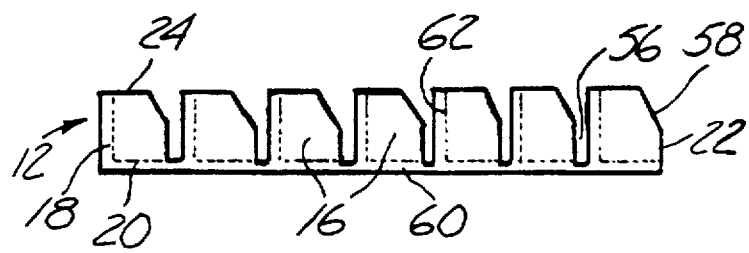
FIG. 3 is a front view of a front sheet made with the template of FIG. 2.

FIG. 3 shows a front sheet 12 cut using the front sheet template 50 of FIG. 2. Each front sheet 12 has the same dimensions as the front sheet template 50. The front sheet 12 has a ½" glue strip 60 (shown by dashed line in FIGS. 3 and 5) along the bottom, and a ¼" glue strip 62 (shown by dashed line in FIGS. 3 and 5) is included along the left edge 18 of each front pocket surface 16.

The front sheets 12 are preferably made of strong but lightweight paper. With front sheets 12 made of paper, the user can write personal notes and/or reminders on the face of any of the daily pockets 26.

Figure 4:
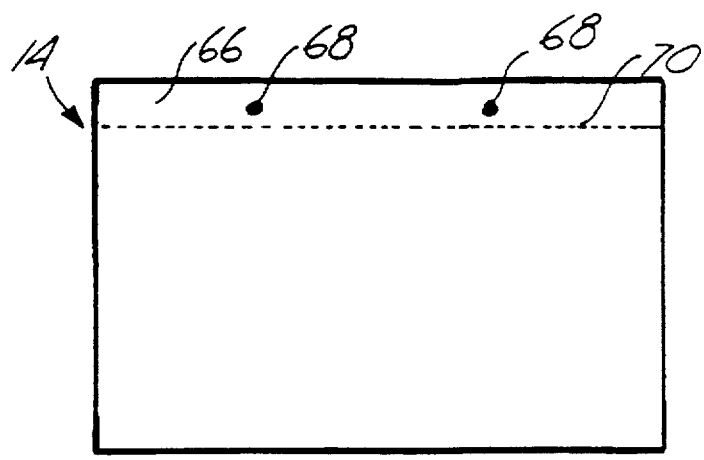
FIG. 4 is a front view of a backing sheet for the calendar organizer.

FIG. 4 shows the backing sheet 14 for the present invention. The backing sheet 14 is substantially continuous and provides the back or rear side for each of the pockets 26. The backing sheet 14 may be made out of a piece of strong but lightweight paper, card stock or board. The front sheets 12 are preferably made of strong but lightweight paper. The preferred dimensions for backing sheet 14 for the pocket sizes described above are about 30" wide and 27" tall.

Figure 5:
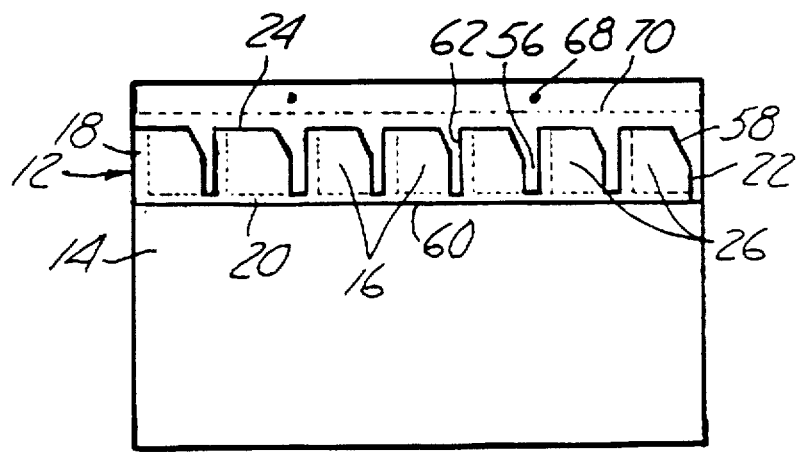
FIG. 5 is a front view of the front sheet of FIG. 3 attached to the backing sheet of FIG. 4.

FIG. 5 shows the front sheet 12 attached to the backing sheet 14. The left edge 18 of each of the front pocket surfaces 16 and the bottom edge 20 of each of the front sheets 12 is tightly secured to the backing sheet 14. The preferred adjoinment is by applying glue or adhesive between the glue strips 60, 62 and the backing sheet 14. Workers skilled in the art will appreciate that numerous attachment arrangements could be used to attach the adjoinment portions 60, 62 of the front sheet 12 to the backing sheet 14.

Figure 6:
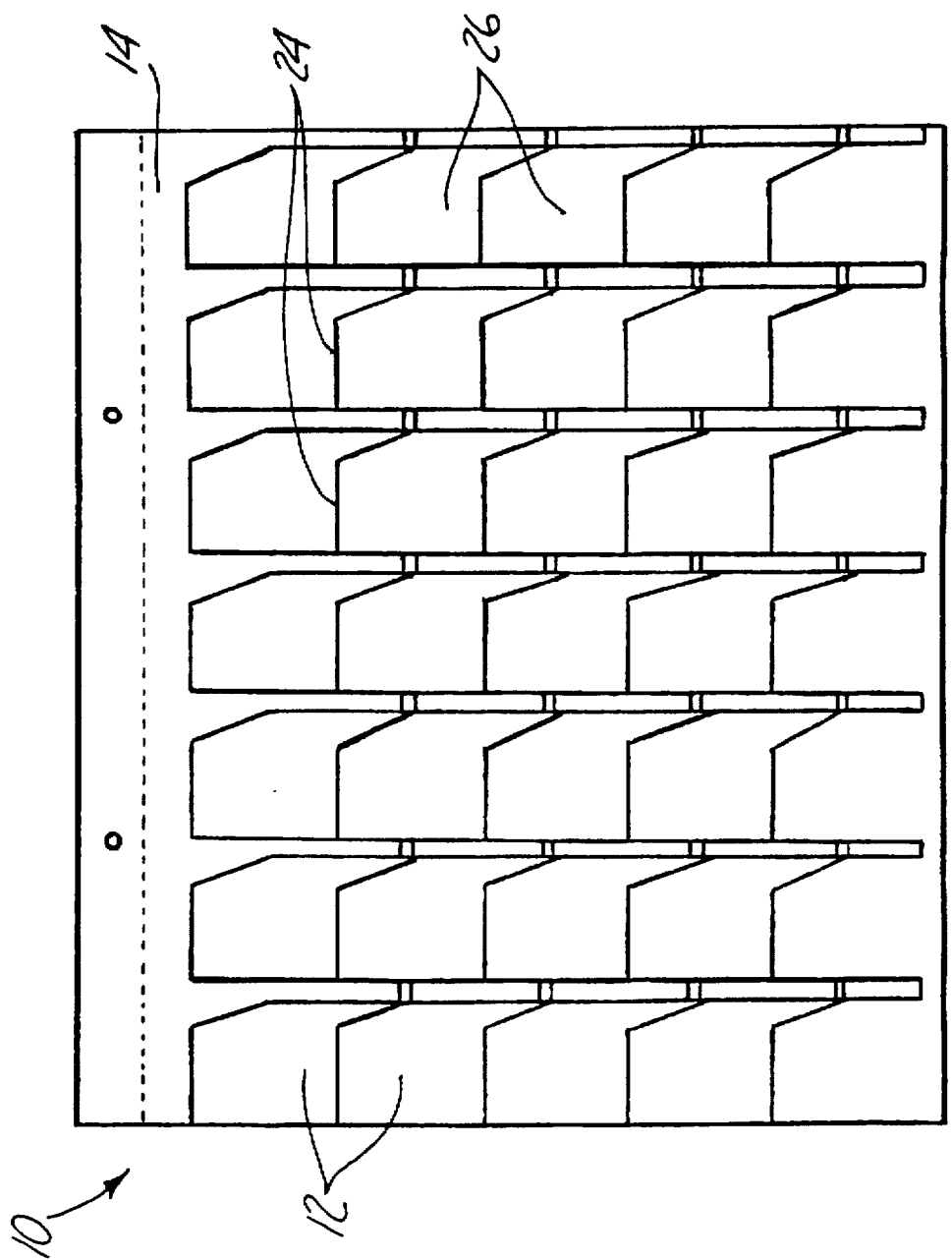
FIG. 6 is a front view of the fully assembled calendar organizer.

FIG. 6 shows the completed assembly for the calendar organizer 10. Moving from top to bottom along the backing sheet 14, five front sheets 12 have been attached to the backing sheet 14. Each lower front sheet 12 is positioned to overlap the preceding front sheet 12 by approximately 2". In this way, the top free edge 24 of each pocket 26 is higher than the bottom corners of the pockets 26 of the preceding week. The overlapping effect minimizes the overall height of the calendar organizer 10 without affecting the generous carrying capacity of each individual daily pocket 26. Because the lower front sheets 12 are overlapping on the upper front sheets 12, the entire calendar organizer 10, including five 6¾" deep pockets 26 and additional room for markings, is provided in a 27" height. Workers skilled in the art will appreciate that the amount of overlap can be chosen as desired for any particular application of the calendar organizer 10.

Workers skilled in the art will also appreciate that, if desired, the front sheets can extend vertically rather than horizontally. For instance, for pockets with an open right edge, a common adjoinment portion can be provided along the left side of a column of front pocket surfaces. With vertically extending front sheets, the overlap can be arranged horizontally rather than vertically. This, would add a little extra height to the calendar organizer, such as eight inches, but would reduce the width of the calendar organizer. If a horizontal overlap is desired on pockets with an open right edge, then the right-most front sheet should be attached to the backing sheet first, and attachment should proceed in an overlapping manner to the left.

Figure 7:
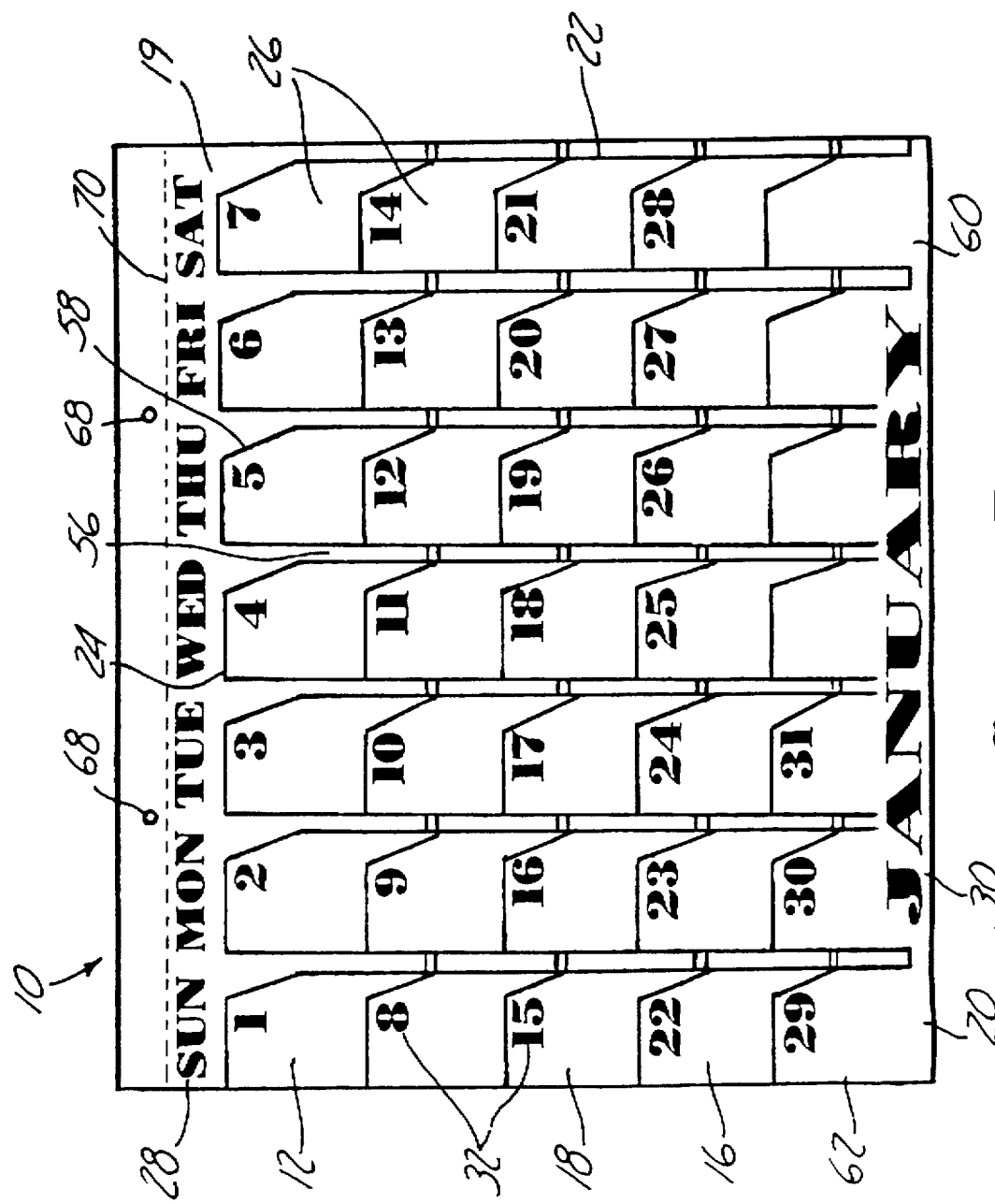
FIG. 7 is a front view of the calendar organizer of FIG. 6 printed for January.

FIG. 7 shows the calendar organizer 10 with markings 28, 30, 32 associated with January. The calendar organizer's overall set-up regarding dates, days of the week (Sun-Sat.), pages, etc., is in accordance with a standard calendar. Workers skilled in the art would appreciate that this printing process for markings 28, 30, 32 can occur either before or after attachment of the front sheets 12 to the backing sheet 14.

Monthly pages 10 such as that shown in FIG. 7 are attached together in multiples to create a calendar organizer of longer duration (shown in FIG. 1). For instance, twelve monthly pages 10 can be used to form a yearly calendar. The backing sheet 14 of each page 10 can be attached to a single backing board 64 (shown in FIG. 1). The attachment of each monthly page 10 to the backing board 64 preferably occurs at the top margin, such as with a simple staple binding 66 which is attractively covered. The backing board 64 includes two holes 68 along the top binding for hanging or other easy and secure mounting of the calendaring system to a wall or other vertical surface. A length-long perforation 70 may be provided at the top margin for easy monthly page removal.

Alternatively, workers skilled in the art will also appreciate that the date markings 32 and month marking 30 can be located on a front indicia sheet (not shown) which is separate from and placed in front of all the front sheets 12. The front indicia sheet would need openings to permit access to the free edges of the pockets 26. If a front indicia sheet is used, the complete pocket structure of the calendar organizer can be retained throughout an entire year or longer duration.

FIGS. 8–14 show alternative front sheet template designs for use with the present invention. The front sheet template 72 of FIG. 8 is similar to the front sheet template 50 of FIG. 2, but has a singular pocket template 74 for both days Sunday and Monday. If desired, the two-day pocket 74 can be larger than the single day pockets 26. An envelope 76 is shown with reference to the front sheet template 72 to depict how items are supported in each of the pockets. A calendar organizer with front sheets from the front sheet template 72 of FIG. 8 is particularly appropriate for business and mailing uses, wherein very few items will be associated with Sunday.

The front sheet template 78 of FIG. 9 is similar to the front sheet template 50 of FIG. 2, but the entire open side of the pocket is the slanted edge 58. The front sheet template 80 of FIG. 10 is similar to the front sheet template 78 of FIG. 9, but the slanted edge 58 is curved rather than straight. The front sheet template 82 of FIG. 11 is similar to the front sheet template 50 of FIG. 2, but the entire open side of the pocket is right edge 22 and top edge 24.

FIGS. 8a, 9a, 10a and 11a show reverse orientations 84, 86, 88, 90 of the front sheet templates 72, 78, 80, 82. The reversed front sheet templates 84, 86, 88, 90 allow items to extend out of the pockets to the left instead of to the right. Workers skilled in the art will appreciate that reversed front sheet templates 84, 86, 88, 90 can be identical to front sheet templates 50, 78, 80, 82, respectively, but used on the opposite side.

Figure 12:
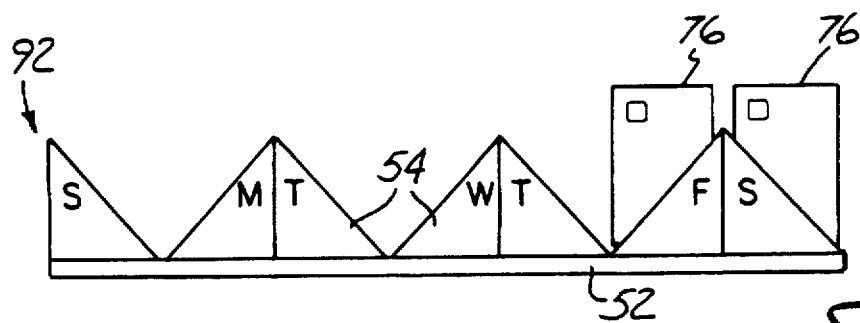
FIG. 12 is a front view of a fifth alternative front sheet template design for the present invention.
Figure 13:
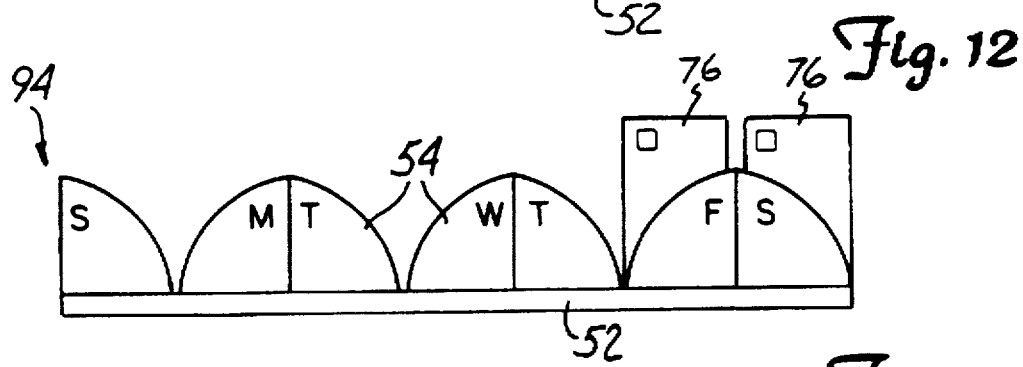
FIG. 13 is a front view of a sixth alternative front sheet template design for the present invention.
Figure 14:
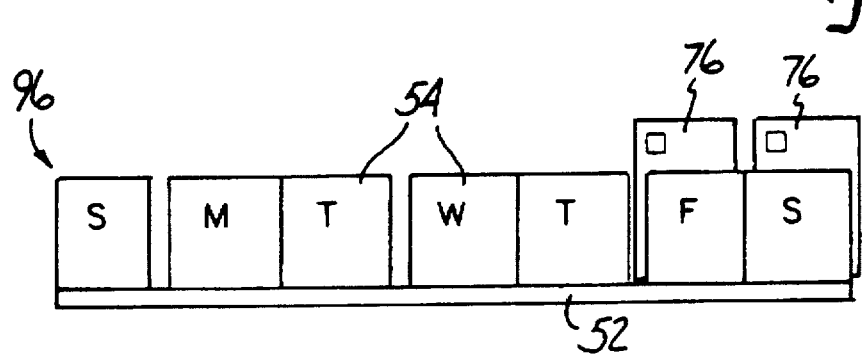
FIG. 14 is a front view of a seventh alternative front sheet template design for the present invention.

The front sheet template 92 of FIG. 12 is similar to the front sheet template 78 of FIG. 9, but the individual front pocket templates 54 alternate in the direction which is left open. Accordingly, pockets for Sunday, Tuesday, Thursday and Saturday can retain items extending out of the pockets to the right, while pockets for Monday, Wednesday and Friday can retain items extending out of the pockets to the left. The front sheet template 94 of FIG. 13 is similar to the front sheet template 80 of FIG. 10, but the individual front pocket templates 54 alternate in the direction which is left open. The front sheet template 96 of FIG. 14 is similar to the front sheet template 82 of FIG. 11, but again the individual front pocket templates 54 alternate in the direction which is left open. Workers skilled in the art will appreciate that a wide variety of similar modifications could be made to specialize the calendar organizer 10 of the present invention.

The present calendar organizer 10 can retain items of a wide variety of sizes associated with each day of the month. The present calendar organizer 10 is easy to make at low cost, and requires only the minimum overall size necessary to provide a large, individual pocket 26 for each day.

Although the present invention has been described with reference to preferred embodiments, workers skilled in the art will recognize that changes may be made in form and detail without departing from the spirit and scope of the invention. For instance, workers skilled in the art will appreciate that the dimensions recited herein can be scaled or changed as necessary for the desired dimensions of the final product.

What is claimed is:

1. A calendar organizer with pockets associated with days on a calendar, the calendar organizer comprising:
   a substantially continuous backing sheet;
   at least one front sheet attached to the backing sheet, the front sheet having a plurality of front pocket surfaces extending therefrom, each front pocket surface being associated with one day on the calendar, each of the front pocket surfaces being attached to the backing sheet along a substantially horizontal bottom edge and along one substantially vertical edge, each of the front pocket surfaces having a top edge unattached to the backing sheet, and each of the front pocket surfaces having a second substantially vertical edge intersecting the bottom edge, said second substantially vertical edge being unattached to the backing sheet, thereby forming a pocket for receiving items associated with that day.

2. The calendar organizer of claim 1, wherein at least five of said front sheets are attached to the backing sheet, each front sheet having a common bottom adjoinment portion extending horizontally and seven of said front pocket surfaces extending upward from the common bottom adjoinment portion, the common bottom adjoinment portion containing the bottom edge for each of the front pocket surfaces, each front sheet being associated with a week on the calendar organizer, the at least five front sheets being associated with a month on the calendar organizer.

3. The calendar organizer of claim 1, wherein the at least one front sheet is a lower front sheet and further comprising an upper front sheet, the lower front sheet and the upper front sheet each having a common bottom adjoinment portion extending horizontally and a plurality of said front pocket surfaces extending upward from the common bottom adjoinment portion, the common bottom adjoinment portion containing the bottom edge for each of the front pocket surfaces, wherein the top edges of the lower front sheet overlie the common bottom adjoinment portion of the upper front sheet.

4. The calendar organizer of claim 1, wherein each of the front pocket surfaces has a slanted edge between the unattached top edge and the second substantially vertical edge.

5. The calendar organizer of claim 1, wherein the backing sheet and the at least one front sheet are formed of paper stock and attached together with glue.

6. The calendar organizer of claim 5, wherein each front pocket surface comprises:

a vertical glue portion along the attached substantially vertical edge; and a horizontal glue portion along the bottom edge.

7. The calendar organizer of claim 6, wherein each front pocket surface is from three to eight inches wide and from three to eight inches tall.

8. The calendar organizer of claim 1, wherein the attached vertical edge is along a left side of each front pocket surface.

9. The calendar organizer of claim 1, further comprising labeling markings to identify the day with which each pocket is associated.

10. The calendar organizer of claim 1, further comprising:

a plurality of such backing sheets with attached front sheets,
each of the backing sheets being commonly bound along an edge.

11. A calendar organizer with pockets, the calendar organizer comprising:

a substantially continuous backing sheet;

at least one front sheet attached to the backing sheet, the front sheet having a plurality of front pocket surfaces extending therefrom, each of the front pocket surfaces being substantially rectangular and having four edges, each of the front pocket surfaces being attached to the backing sheet along two adjacent edges of the four edges and being unattached to the backing sheet along the entire extent of the other two of the four edges, said unattached edges each intersecting one of the attached edges, thereby forming a pocket with two open edges for receiving items associated with that pocket.

12. The calendar organizer of claim 11, wherein at least five of said front sheets are attached to the backing sheet, each front sheet having a common bottom adjoinment portion extending horizontally and the front pocket surfaces extending upward from the common bottom adjoinment portion, the common bottom adjoinment portion containing the one of the attached edges for each of the front pocket surfaces, each front sheet being associated with a week on the calendar organizer, the at least five front sheets being associated with a month on the calendar organizer.

13. The calendar organizer of claim 11, wherein one of the unattached edges comprises a slight bend to provide a slanted edge.

14. The calendar organizer of claim 11, wherein the backing sheet and the at least one front sheet are formed of paper stock and attached together with glue, wherein each front pocket surface comprises:

a vertical glue portion of along one of the attached edges; and a horizontal glue portion along the other of the attached edges.

15. The calendar organizer of claim 11, and further comprising labeling markings to identify the day with which each pocket is associated.

16. An organizer with pockets, the organizer comprising:

a substantially continuous backing sheet;

a plurality of front sheets attached to the backing sheet, each front sheet having a plurality of front pocket surfaces extending therefrom, each of the front pocket surfaces having a bottom edge, a side edge intersecting the bottom edge and a top edge, each of the front pocket surfaces being attached to the backing sheet along the bottom edge and being unattached to the backing sheet along the side edge and along the top edge, thereby forming a pocket with two open edges for receiving items associated with that pocket, wherein the front pocket surface is arranged in a grid pattern with columns and rows with lower front pocket surfaces which at least partially overlie upper front pocket surfaces.

17. The organizer of claim 16, wherein each of said front sheets has a common bottom adjoinment portion extending horizontally and the front pocket surfaces extending upward from the common bottom adjoinment portion, the common bottom adjoinment portion containing the bottom edge for each of the front pocket surfaces.

18. The organizer of claim 16, wherein each of the front pocket surfaces has a slanted edge between the unattached side edge and the unattached top edge.

19. The organizer of claim 16, wherein the backing sheet and the plurality of front sheets are formed of paper stock and attached together with glue, wherein each front pocket surface comprises:

a horizontal glue portion along the bottom edge.

20. The organizer of claim 16, further comprising labeling markings to identify each pocket.

* * * * *